Aug. 23, 1966

F. W. BENNIES 3,267,981

REPAIR PATCH FOR DAMAGED PNEUMATIC
TIRES OF AUTOMATIVE VEHICLES

Filed Dec. 21, 1964

INVENTOR

FRANZ WILLY BENNIES by E. M. Squire his attorney

United States Patent Office 3,267,981
Patented August 23, 1966

3,267,981
REPAIR PATCH FOR DAMAGED PNEUMATIC
TIRES OF AUTOMATIVE VEHICLES
Franz Willy Bennies, Hamburg-Altona, Germany, assignor to Fritz Hesselbein Chemische Fabrik, Hamburg, Germany, a corporation of Germany
Filed Dec. 21, 1964, Ser. No. 419,983
Claims priority, application Germany, June 9, 1964, H 52,913
2 Claims. (Cl. 152—367)

This invention relates to a repair patch for damaged pneumatic tires, and more particularly to patches for repairing tubeless pneumatic tires of automotive vehicles, the patches consisting of mutually perpendicularly arranged layers of cords formed of threads of polyamide, polyurethane, or the like embedded in caoutchouc, which layers form reinforcing plies for the patch and are in turn embedded between a surface layer and a padding layer of caoutchouc having a tapering peripheral margin extending beyond the cord layers, wherein the padding layer is provided with an adhesive layer of initially unvulcanized caoutchouc covered, prior to use, by a protective foil.

Due to the high speeds and great loads of the automotive vehicles, modern pneumatic tires require carcasses with cord layers of threads of polyamide, polyurethane, or the like, which preferably are molecularly oriented whereby the tires acquire great strength. Accordingly, modern repair patches for repairing damaged spots of the tire must be made with cord layers of such molecularly oriented plastic material. These threads of polyamide, or the like, have the inherent characteristic that caoutchouc adheres to them poorly, if at all. Therefore, the lateral surfaces of the filaments forming the cord threads must be subjected to a conventional treatment prior to the manufacture of the cord layers whereby, when the threads are embedded in caoutchouc, the caoutchouc is firmly united with the thread surface, while the core of the filament remains uninfluenced, so as to preserve the molecular orientation.

Now, if pieces of desired lengths and widths are cut from larger cord layers, for making the above mentioned cord layer core of the repair patch, the severed and faces of the filaments are not treated to adhere to the caoutchouc.

In accordance with the invention, the ends of the cords of the longest cord layer are reversely folded about 180° to provide end portions of double thickness. By means of this reverse fold the ends of the cord filaments or cord layers are formed by a fold line, so that there are no untreated end faces of the cord filaments at the ends of the longest cord layer, i.e. the prior treatment of the filaments for a firm adherence of the caoutchouc is maintained at this fold line, whereby the caoutchouc of the thin, tapering margin will not only be united with the caoutchouc between the filaments but also with the folded filaments at the ends of the folded cord layer. Thereby it is prevented that, due to the flexing action of the tire, minute cavities are formed in front of these fold points which finally cause loosening of the thin, tapering peripheral margin of the patch.

For a better understanding of the invention, it will now be described with reference to the accompanying drawings, in which.

Figure 1:
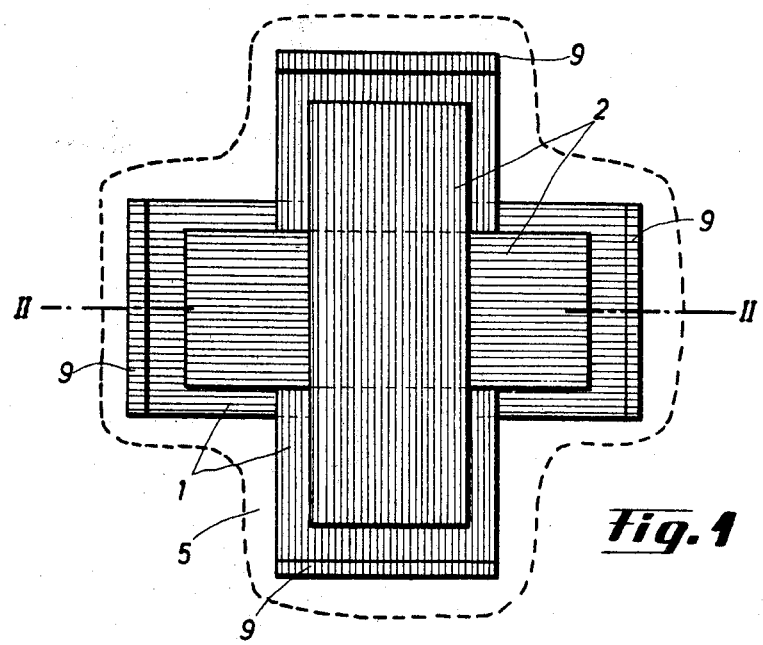
FIG. 1 is a top view of the cord layer core of a repair patch according to the invention in which the contour of the thin, tapering peripheral caoutchouc portion is shown in dashed lines.

The repair patch embodiment shown by way of example is made of mutually perpendicular longer cord layers 1 and superposed mutually perpendicular shorter and narrower cord layers 2 in which the several layers form the patch core. In FIG. 1 only two sets of mutually perpendicular layers are shown, however, it is also possible to use only one pair of mutually perpendicular layers, or, if desired, more than two pairs for one repair patch core. The core formed by the crossing stacked layers 1 and 2 is covered by a surface cover 3 of caoutchouc and a lower padding cover 4 of caoutchouc, the patch is vulcanized in a vulcanizing press, in which the press mold is made in such a way that the caoutchouc of the covers 3 and 4 are pressed out to a very thin tapering margin 5 diminishing to zero thickness and projecting beyond the ends of the longest cord layer strips 1. Then the repair patch is provided with an adhesive layer 6 applied to the padding cover 4.

Figure 2:
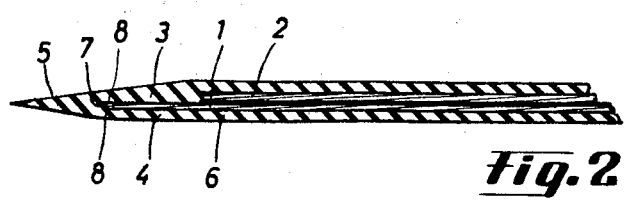
FIG. 2 is an enlarged fragmentary cross sectional view taken along line II—II of FIG. 1 of a conventional repair patch.

The filaments of the cord layers 1 and 2 are made of molecularly oriented plastic material such as polyamide, polyurethane, or the like, and are surface treated in such a manner that these surfaces will provide a firm adhesive connection with the caoutchouc. Since the cord layers in conventional patches are cut out of large laminar layers end faces 7 are formed at the ends of the cord filaments, as seen in FIG. 2, which are not surface treated, so that the caoutchouc of the thin, outwardly convergent margin 5 does not have an adhesive connection with these cut faces. When such repair patches are subjected to flexing action while driving, particularly in tubeless pneumatic tires, the accompanying stretching of the thin, diminishing margin 5 causes the formation of small cavities in front of the cut end faces 7 which will gradually grow larger until finally the thin, tapering margin will be separated from the core 1, 2. In addition it was found that in conventional repair patches, according to FIG. 2, the caoutchouc material in the marginal zone of the ends of the layers at 8 becomes weakened which also contributes to the tearing-off of the tapering margin 5.

Figure 3:
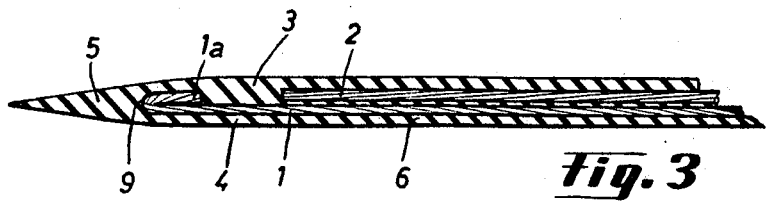
FIG. 3 is cross sectional view similar to FIG. 2 showing a repair patch embodying the invention.

Referring now to FIGS. 1 and 3 it will be seen that the ends of the longest crossing cord layers 1 are initially reversely folded upwardly or downwardly, about 180° to provide a short layer of double thickness with a length of approximately 1 to 2 cm. and thereafter, the patch is vulcanized in a vulcanizing press after the surface cover layer 3 and the padding cover layer 4 have been applied above and below the core 1, 2. Now, it has been found that the reversely folded double thickness ends 1a of the cord threads will practically be pressed more or less into the plane of the layer 1 and between the cord threads thereof in the vulcanizing press thereby maintaining a bead-like reenforcement at this zone and that the fold lies in the center between the surface cover layer and the padding cover layer. In any case, the filaments consisting of molecularly oriented plastic material are surface treated in the zone of the fold 9 so that the caoutchouc of the thin, outwardly convergently tapering margin 5 not only has a firm surface connection with the caoutchouc of the cord layers but also with the filaments at the fold points. Furthermore, it has been found that by folding the ends 1a of the cord layer 1, weakening of surface cover layer and padding cover layer material is avoided in the zone of the fold points; conventional patch shown in FIG. 2.

While I have shown and described what I believe to be the best embodiments of my invention, it will be apparent to those skilled in the art that various changes and modifications may be made therein without departing from the spirit and scope of the invention as defined in the appended claims.

What I claim is:

1. A tire repair patch of the class described, comprising: at least two superposed layers of cords, each layer comprising a series of parallel cords forming a reinforcing ply for said patch, the cords in one layer extending substantially perpendicularly with respect to the cords in the other layer, each cord being formed of molecularly oriented synthetic polymeric filaments, the lateral surfaces of said filaments having been subjected to treatment for adhesion to caoutchouc when vulcanized thereto, said treatment being omitted from the end surfaces of said filaments, the end portions of each cord extending reversely toward the central portion thereof, whereby said cords terminate in 180° bends forming a layer of substantially double thickness; a surface cover layer of caoutchouc extending over all of said layers of cords and therebeyond at one side thereof; a padding layer of caoutchouc extending over all of said layers of cords and therebeyond at the other side thereof, said cover and padding layers being peripherally joined to form an outwardly convergently tapering peripheral portion for said patch connected to said cords at said 180° bends, said padding layer including an outer adhesive layer portion for securing said patch to a repaired tire.

2. A patch according to claim 1, wherein said adhesive layer portion of said padding layer is formed of initially unvulcanized caoutchouc.

References Cited by the Examiner
UNITED STATES PATENTS

| | | | |
|---|---|---|---|
| 2,982,328 | 5/1961 | Emanueli et al. | 152—361 |
| 3,004,580 | 10/1961 | Chambers et al. | 152—367 |

ARTHUR L. LA POINT, *Primary Examiner.*

C. W. HAEFELE. *Assistant Examiner.*